United States Patent
Caron et al.

(10) Patent No.: US 6,577,759 B1
(45) Date of Patent: Jun. 10, 2003

(54) SYSTEM AND METHOD FOR PERFORMING REGION-BASED IMAGE RETRIEVAL USING COLOR-BASED SEGMENTATION

(75) Inventors: Cedric Y. Caron, Croton-on-Hudson, NY (US); Yong Yan, Yorktown Heights, NY (US); Kiran Challapali, Stamford, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/375,951

(22) Filed: Aug. 17, 1999

(51) Int. Cl.$^7$ ................................................. G06K 9/34
(52) U.S. Cl. ...................................................... 382/164
(58) Field of Search ........................ 707/3, 6; 382/164, 382/165, 170, 167, 162; 358/520; 345/603, 604

(56) References Cited

U.S. PATENT DOCUMENTS

| | | | | |
|---|---|---|---|---|
| 4,819,077 A | * | 4/1989 | Kikuchi | 358/98 |
| 5,557,688 A | * | 9/1996 | Nakamura | 382/164 |
| 5,668,890 A | * | 9/1997 | Winkelman | 382/167 |
| 5,799,105 A | * | 8/1998 | Tao | 382/167 |
| 5,825,917 A | * | 10/1998 | Suzuki | 382/164 |
| 6,088,137 A | * | 7/2000 | Tomizawa | 358/538 |
| 6,453,069 B1 | * | 9/2002 | Matsugu et al. | 382/164 |

FOREIGN PATENT DOCUMENTS

EP  0558054 A2  9/1993

OTHER PUBLICATIONS

Ballerad et al., "Computer Vision", YS, Englewood Cliffs, Prentice Hall, 1989, pp. 149–165, XP002158527.

J.R. Smith et al., "Tools and Techniques for Color Image Retrieval", Proceedings of SPIE, US, Bellingham, SPIE, vol. 2670, Feb. 1996,, pp. 426–437,, XP000642585.

* cited by examiner

Primary Examiner—Jon Chang
Assistant Examiner—Brian Le
(74) Attorney, Agent, or Firm—Gregory L. Thorne

(57) ABSTRACT

There is disclosed an image retrieval system for analyzing an image in a first color model format and detecting and retrieving from the image a selected image portion. The image retrieval system comprises an image processor for converting pixels in the image from the first color model format to a (Yrθ) color model format, where Y is an intensity component indicating a total amount of light, r is a saturation component indicating an amount of white light mixed with a color of each pixel, and θ is a hue component indicating the color of each pixel. The image processor groups spatially adjacent pixels into image regions according to hue components of the adjacent pixels and performs a merging process wherein a first image region and an adjacent second image region are merged into a composite region if a hue difference between the first and second image regions is less than a predetermined hue difference threshold. The process is repeated to continually merge regions of similar hue until no further merges can be performed.

22 Claims, 4 Drawing Sheets

SYSTEM AND METHOD FOR PERFORMING REGION-BASED IMAGE RETRIEVAL USING COLOR-BASED SEGMENTATION

TECHNICAL FIELD OF THE INVENTION

The present invention is directed, in general, to image retrieval systems and, more specifically, to an image retrieval system using color-based segmentation to retrieve region-based images.

BACKGROUND OF THE INVENTION

The advent of digital television (DTV), the increasing popularity of the Internet, and the introduction of consumer multimedia electronics, such as compact disc (CD) and digital video disc (DVD) players, have made tremendous amounts of multimedia information available to consumers. As video and animated graphics content becomes readily available and products for accessing it reach the consumer market, searching, indexing and identifying large volumes of multimedia data becomes even more challenging and important.

The term "visual animated data" herein refers to natural video, as well as to synthetic 2D or 3D worlds, or to a mixture of both video and graphics. Different criteria are used to search and index the content of visual animated data, such as a video clip. Video processing devices operating as image retrieval systems have been developed for searching frames of visual animated data to detect, identify and label objects of a particular shape or color, or to detect text in the frames, such as subtitles, advertisement text, or background image text, such as a street sign or a "HOTEL" sign.

Many of the existing image retrieval systems require a template image in order to search for all the images that resemble the template. For many applications, sub-image matching or object shape-based matching might be more desirable than full-image matching. For instance, a user may wish to retrieve images of red cars from an archive of images, but may not want to retrieve the remaining portion of the original image. Alternatively, a user may have a particular interest in retrieving all images that include a particular shape or a combination of shapes. This type of image retrieval is known as "region-based image retrieval."

The extraction of image regions in an automatic and robust fashion is an extremely difficult task. Although image segmentation techniques have been studied for more than thirty years, segmentation of color images in real-world scenes is still particularly challenging for computer vision applications. This is primarily due to illumination changes in images, such as shade, highlights, and sharp contrast. For example, nonuniform illumination produces nonuniformity in the values of image pixels in RGB and YUV color spaces in conventional image segmentation techniques.

There is, therefore, a need in the art for improved video processing devices capable of performing region-based image retrieval. In particular, there is a need for improved region-based image retrieval systems capable of performing color-based segmentation that are less sensitive to illumination conditions.

SUMMARY OF THE INVENTION

To address the above-discussed deficiencies of the prior art, it is a primary object of the present invention to provide, for use in an image retrieval system capable of analyzing an image comprising a plurality of pixels in a first color model format, an image processing device capable of detecting and retrieving from the image a selected image portion. The image processing device comprises an image processor capable of converting the plurality of pixels in the image from the first color model format to a $(Y,r,\theta)$ color model format, wherein for each pixel in the plurality of pixels, Y is an intensity component indicating a total amount of light, r is a saturation component indicating an amount of white light mixed with a color of the pixel, and $\theta$ is a hue component indicating the color of the pixel. The image processor is capable of grouping spatially adjacent ones of the plurality of pixels into a plurality of image regions according to hue components of the adjacent pixels and performing a merging process wherein a first image region and a second image region proximate the first image region are merged into a composite region if a hue difference between the first and second image regions is less than a predetermined hue difference threshold.

According to an exemplary embodiment of the present invention, the image processor is capable of determining a histogram of hue components of the pixels in the image, the histogram indicating a number of pixels of similar hue in the image.

According to one embodiment of the present invention, the image processor is capable of determining a dominant hue in the image using a peak detection algorithm on the histogram.

According to another embodiment of the present invention, the image processor is capable of determining and marking ones of the plurality of image regions having less than a predetermined minimum number of pixels and disregarding the marked image regions during the merging process.

According to still another embodiment of the present invention, the image processor is capable of determining and marking achromatic ones of the plurality of image regions having less than a predetermined minimum number of pixels and disregarding the marked achromatic image regions during the merging process.

According to yet another embodiment of the present invention, the first and second image regions are merged if a number of pixels in the first image region and a number of pixels in the second image region are greater than a predetermined image region size threshold.

According to a further embodiment of the present invention, the image processor is capable of determining a plurality of adjacent regions to the first image region and calculating merit values for the plurality of adjacent regions, wherein a merit value of a first selected adjacent region is equal to a ratio of a common perimeter of the first image region and the first selected adjacent region to a total perimeter of the first selected adjacent region.

According to a still further embodiment of the present invention, the image processor selects the second image region to be merged with the first image region according to a merit value of the second image region.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "processor" or "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged image retrieval system.

Figure 1:
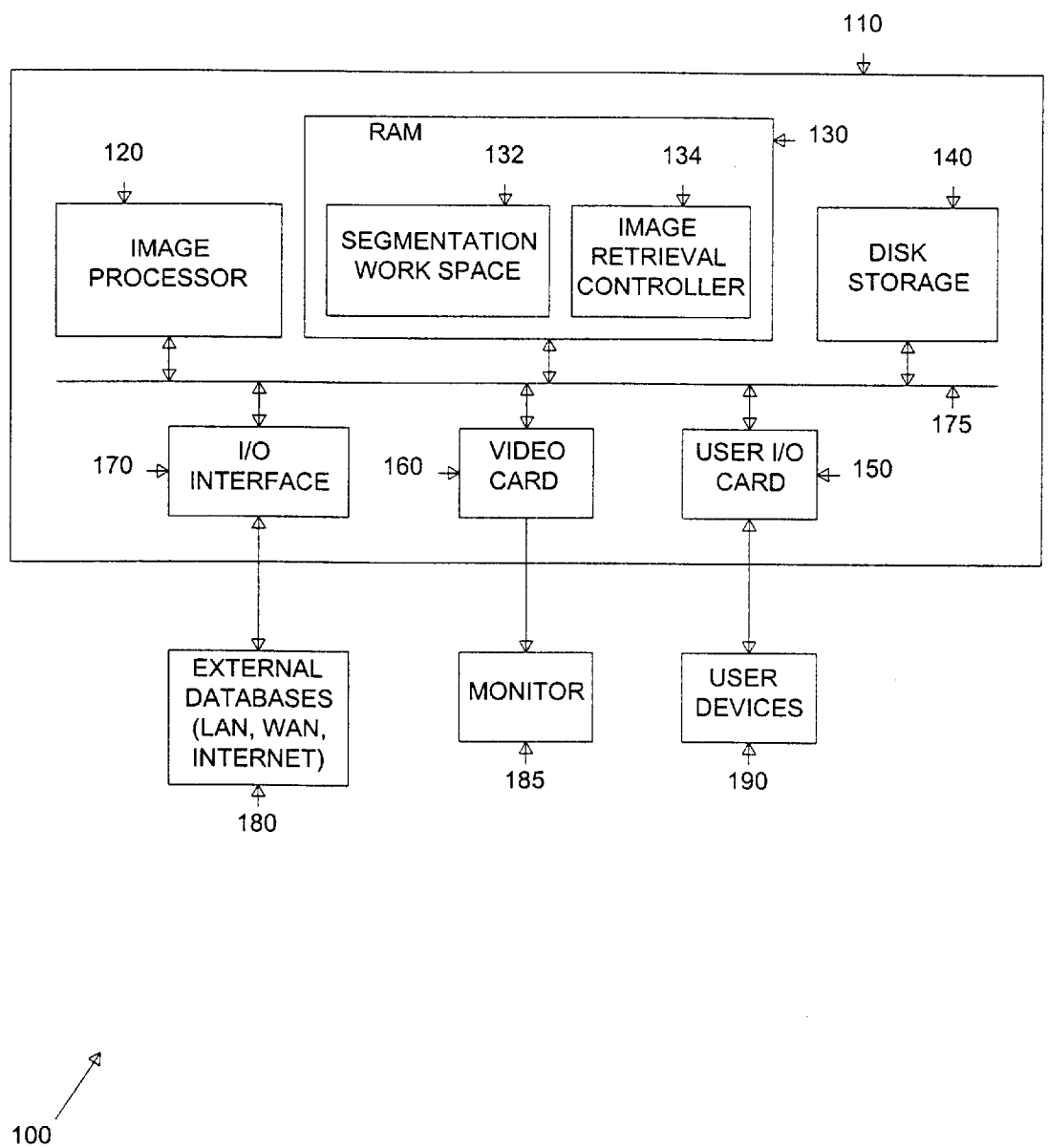
FIG. 1 illustrates an exemplary image retrieval system in accordance with one embodiment of the present invention.

FIG. 1 illustrates exemplary image retrieval system 100 in accordance with one embodiment of the present invention. Image retrieval system 100 comprises image processing system 110, external databases 180, monitor 185, and user devices 190. Image processing system 110 provides the means for retrieving region-based images from within selected image files.

External databases 180 provides a source for retrieval of a digitized visual image or images as well as other information for use by the system, as required. These databases may be provided through access with a local area network (LAN), wide area network (WAN), internet, and/or other sources such as direct access to data through external devices such as tape, disk, or other storage devices.

Monitor 185 provides means for visual display of the retrieved images. User device(s) 190 represents one or more peripheral devices that may be manipulated by the user of image retrieval system 100 to provide user inputs for the system. Typical peripheral user input devices include a computer mouse, a keyboard, a lightpen, a joystick, a touch-table and associated stylus, or any other device that may selectively be used to enter, to select, and to manipulate data, including all or portions of the retrieved image(s). User device(s) 190 may also include output devices, such as a color printer, which can be utilized to capture a particular retrieved or modified image.

Image processing system 110 comprises image processor 120, random access memory (RAM) 130, disk storage 140, user input/output (I/O) card 150, video card 160, I/O interface 170, and processor bus 175. RAM 130 further comprises segmentation work space 132 and image retrieval controller 134. Processor bus 175 transfers data between all of the components of image processing system 110. Image processor 120 provides over-all control for image processing system 110 and performs the image processing needed to implement image segregation of the present invention, as well as other requirements for image retrieval and editing systems. This includes processing of color images in accordance with the principles of the present invention, processing image editing functions, processing of digitized video images for transfer to monitor 185 or for storage in disk storage 140, and control of data transfer between the various elements of the image processing system. The requirements and capabilities for image processor 120 are well known in the art and need not be described in greater detail other than as required for the present invention.

RAM 130 provides random access memory for temporary storage of data produced by image processing system 110, which is not otherwise provided by components within the system. RAM 130 includes memory for segmentation work space 132, image retrieval controller 134, as well as other memory required by image processor 120 and associated devices. Segmentation work space 132 represents the portion of RAM 130 in which the initial video image and any modified region-based images are temporarily stored during the color segmentation process. Segmentation work space 132 provides means for defining image region(s) and segmenting image(s), shapes, and areas of the same color from an externally or internally supplied original visual image without impacting the original data so that the original data and image can be recovered, as required. Image retrieval controller 134 represents a portion of RAM 130 that is dedicated to storage of an application program executed by image processor 120 to perform region-based image retrieval using color-based segmentation of the present invention. Image retrieval controller 134 may execute well-known editing techniques, such as smoothing or boundary detection between images, as well as the novel techniques for image separation associated with the present invention. Image retrieval controller 134 may also be embodied as a program on a CD-ROM, computer diskette, or other storage media that may be loaded into a removable disk port in disk storage 140 or elsewhere, such as in external databases 180.

Disk storage 140 comprises one or more disk systems, including a removable disk, for "permanent" storage of programs and other data, including required visual data and the program instructions of image retrieval controller 134. Depending upon system requirements, disk storage 140 may be configured to interface with one or more bidirectional buses for the transfer of visual data to and from external databases 180, as well as the rest of the system. Depending upon specific applications and the capability of image processor 120, disk storage 140 can be configured to provide capability for storage of a large number of color images.

User I/O card 150 provides means for interfacing user device(s) 190 to the rest of image processing system 100. User I/O card 150 converts data received from user devices 190 to the format of interface bus 175 for transfer to image processor 120 or to RAM 130 for subsequent access by image processor 120. User I/O card 150 also transfers data to user output devices such as printers. Video card 160 provides the interface between monitor 185 and the rest of image processing system 110 through data bus 175.

I/O interface 170 provides an interface between external databases 180 and the rest of image processing system 100 through bus 175. As previously discussed, external databases 180 has at least one bidirectional bus for interfacing with I/O interface 170. Internal to image processing system 110, I/O interface 170 transfers data received from external databases 180 to disk storage 140 for more permanent storage, to image processor 120, and to RAM 130 to provide temporary storage for segmentation and monitor display purposes.

Figure 2:
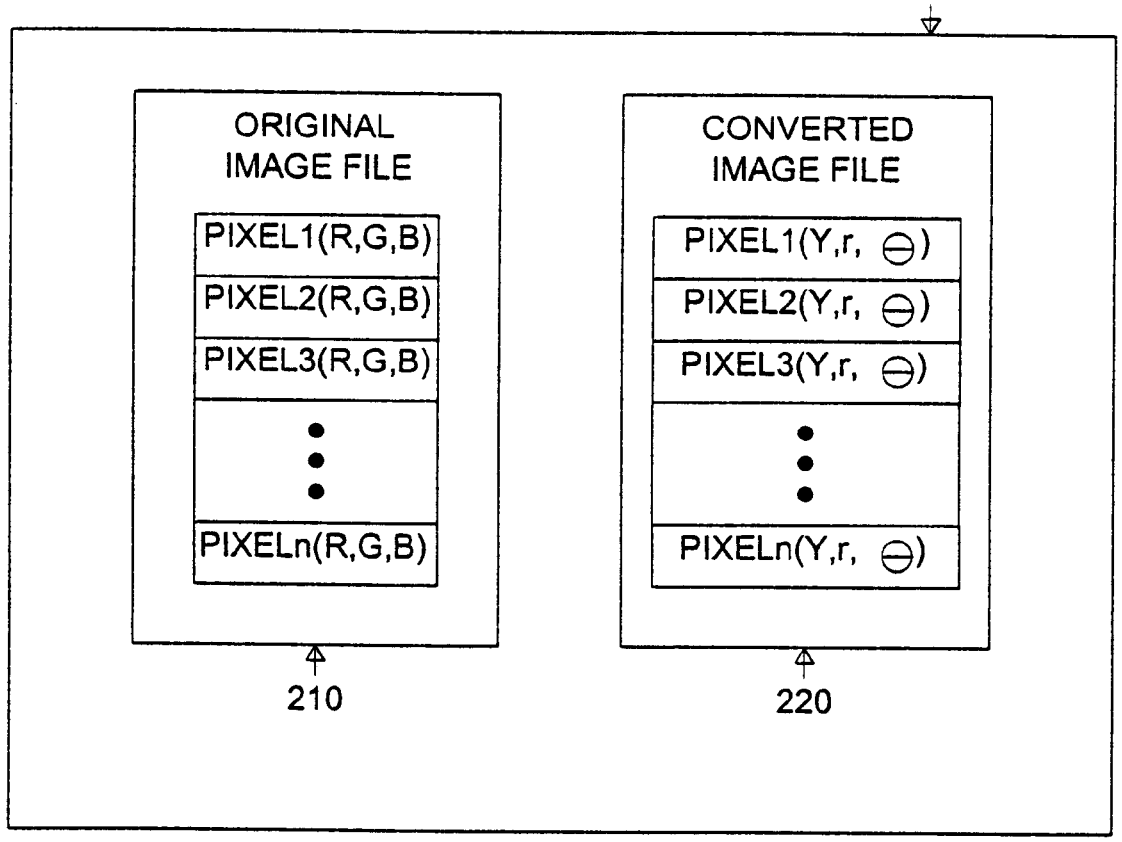
FIG. 2 illustrates an exemplary original image file and a converted image file in the segmentation work space of the image retrieval system in FIG. 1.

FIG. 2 illustrates exemplary original image file 210 and converted image file 220 in segmentation work space 132 of the image retrieval system in FIG. 1. Original image file 210 provides storage for each pixel (labeled 1 though n) associated with the original image received from external databases 180 in, for example, RGB format. The storage space for each pixel is sized for the maximum number of color value bits required for is the particular implementation, as well as any other bits of information typically available for a color image system. Conventional RGB-based color image systems cover a range from 8 bits/pixel to 24 bits/pixel, though larger systems can be accommodated with appropriate memory increases. The converted image file 220 provides n storage locations for the pixels in the (Yrθ) format of the present invention.

Figure 3:
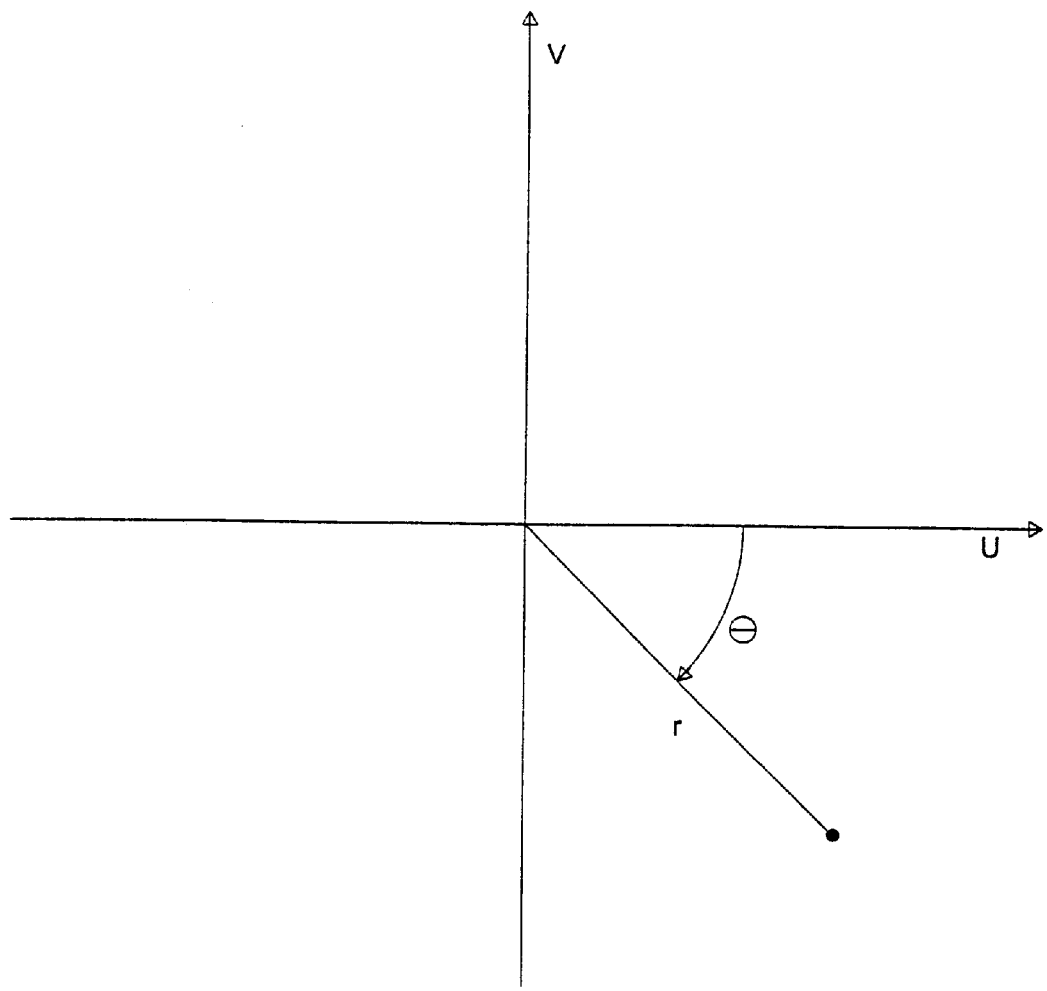
FIG. 3 illustrates an exemplary color space for converting image files in accordance with one embodiment of the present invention.

FIG. 3 illustrates exemplary color space 300 for use in converting image files in (RGB) format or (YUV) format to (Yrθ) format in accordance with one embodiment of the present invention. Color space 300 represents color in terms of intensity (Y), which indicates the total amount of light, saturation (r), which indicates the amount of white light mixed with color, and hue (θ), which represents the type of color which is present. Image processor 120 converts pixels from, for example, (RGB) format or (YUV) format in the original image file to (Yrθ) format using one or more of the following formulae:

$V = R - Y$ $U = B - Y$ $\theta = \arctan(V/U)$ $r = (U^2 + V^2)^{1/2}$ $Y = Y$

In a similar manner, image processor 120 may convert pixels in other color space formats to (Yrθ) format.

Figure 4:
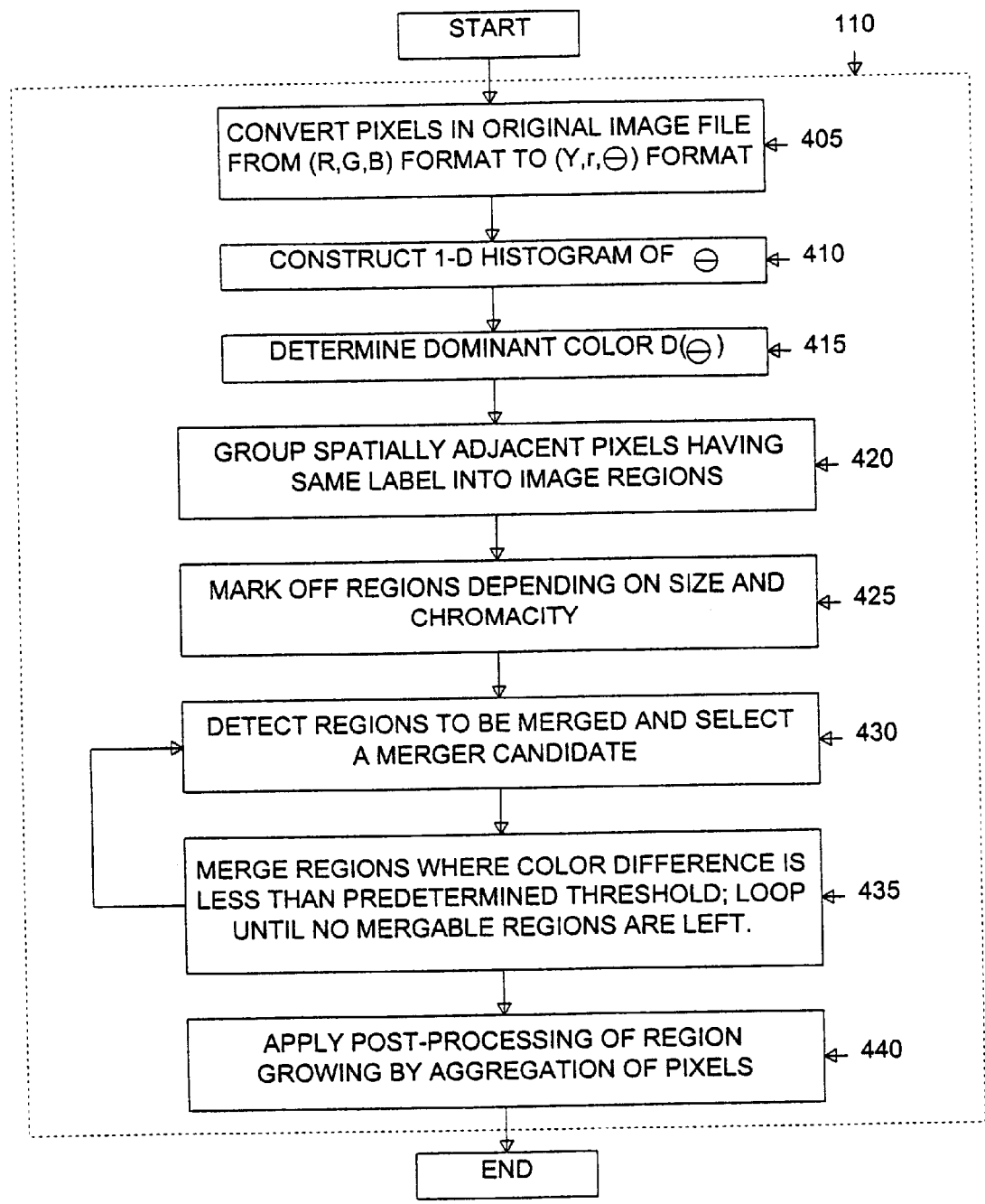
FIG. 4 is a flow diagram which illustrates the operation of an image retrieval system in accordance with one embodiment of the present invention.

FIG. 4 depicts flow diagram 400 which illustrates the operation of image retrieval system 100 in accordance with one aspect of the present invention. Initially, the stored RGB formatted image file received from external databases 180 is converted to (Yrθ) format using the conversion equations and is stored in converted image file 132 (process step 405). Next, image processor 120 uses the n pixels in (Yrθ) format to develop a one-dimensional (1-D) histogram of hue (θ) for each converted pixel (process step 410). The histogram is restricted to pixels for which r>5 and Y>40. This is because at small values of r, θ is unstable and, when Y is low, θ is meaningless (indicates a low level of light which causes colors to merge toward black or achromatic).

The dominant color or colors, d(θ), is/are then determined from the histogram using a peak detection algorithm (process step 415) that identifies the color or colors having the highest proportions of pixels. The histogram is examined and pixels are identified as having color (chromatic) or no color (achromatic). The dominant color(s) and chromatic or achromatic information is stored in RAM 132 segmentation work space 12 for later use.

Next, image processor 120 examines the converted image pixels and groups them according to color and location. Pixels with the same color label (Yrθ description) are examined to determine their proximity to others within the color group. Spatially adjacent pixels with the same color label are grouped together as image regions (process step 420).

Chromatic image regions with less than a predefined minimum threshold number of pixels (e.g., 10 pixels) and achromatic regions with less than a predefined minimum threshold number of pixels (e.g., 20 pixels) are marked off for post-processing. Achromatic regions with more than a predefined maximum threshold number of pixels (e.g., 20 pixels) are also marked off to prevent them from being merged with other regions. In addition, the remaining chromatic image regions are grouped by size and chromacity as a basis for initial merging. One embodiment of the present invention identifies comparatively large image regions with greater than, for example, 200 pixels as potential merger candidates (process step 425).

Next, image processor 120 examines the comparatively large image regions to determine color, θ, similarity and the amount of mutual border space (shared perimeter) with other suitable regions. One embodiment of the present invention uses a merit function which determines the percentage of shared border or perimeter space compared to the sum of the individual region perimeters:

merit func.=shared perimeter/(perimeter1+perimeter2)

Using this merit function, two neighboring regions are selected as initial candidates for image merging (process step 430).

The colors of the selected image regions are examined to determine the degree of similarity. If the difference between colors is less than a pre-defined threshold difference (for example 10°), the regions are merged, the combined region replaces the merged regions in the large region segmentation work space, and the process continues. If the color difference between neighboring regions is greater than the threshold, the regions are not merged, and the process continues until no more mergers are possible (process step 435).

Once all large regions are merged with those of like or similar color space, image processor 120 examines the smaller regions previously identified for post-processing to determine shared perimeters and similar color indicator with the merged regions. The smaller regions are then merged with larger regions with shared perimeters and similar θ and the result is stored in the segmentation work space (process step 440). At this point, the merged image regions are stored as a segmented image file which is then available for use by image processor 120 via control by user manipulation of user devices. The segmented image files may then be stored in disk storage 140 for later retrieval and use.

Although the present invention has been described in detail, those skilled in the art should understand that they can make various changes, substitutions and alterations herein without departing from the spirit and scope of the invention in its broadest form.

What is claimed is:

1. For use in an image retrieval system capable of analyzing an image comprising a plurality of pixels in a first color model format, an image processing device capable of detecting and retrieving from said image a selected image portion, said image processing device comprising:

an image processor capable of converting said plurality of pixels in said image from said first color model format to a (Y,r,θ) color model format, wherein for each pixel in said plurality of pixels, Y is an intensity component indicating a total amount of light, r is a saturation component indicating an amount of white light mixed with a color of said each pixel, and θ is a hue component indicating said color of said each pixel, wherein said image processor is capable of grouping spatially adjacent ones of said plurality of pixels into a plurality of image regions according to hue components of said adjacent pixels and performing a merging process wherein a first image region and a second image region proximate said first image region are merged into a composite region if a hue difference between said first and second image regions is less than a predetermined hue difference threshold, and wherein said image processor is capable of determining a plurality of adjacent regions to said first image region and calculating merit values for said plurality of adjacent regions, wherein a merit value of a first selected adjacent region is equal to a ratio of a common perimeter of said first image region and said first selected adjacent region to a total perimeter of said first selected adjacent region.

2. The image processing device set forth in claim 1 wherein said image processor is capable of determining a histogram of hue components of said pixels in said image, said histogram indicating a number of pixels of similar hue in said image.

3. The image processing device set forth in claim 2 wherein said image processor is capable of determining a dominant hue in said image using a peak detection algorithm on said histogram.

4. The image processing device set forth in claim 1 wherein said image processor is capable of determining and marking ones of said plurality of image regions having less than a predetermined minimum number of pixels and disregarding said marked image regions during said merging process.

5. The image processing device set forth in claim 1 wherein said image processor is capable of determining and marking achromatic ones of said plurality of image regions having less than a predetermined minimum number of pixels and disregarding said marked achromatic image regions during said merging process.

6. The image processing device set forth in claim 5 wherein said first and second image regions are merged if a number of pixels in said first image region and a number of pixels in said second image region are greater than a predetermined image region size threshold.

7. The image processing device set forth in claim 1 wherein said image processor selects said second image region to be merged with said first image region according to a merit alue of said second image region.

8. An image retrieval system capable of analyzing an image comprising a plurality of pixels in a first color model format comprising:

an image processing device capable of detecting and retrieving from said image a selected image portion, said image processing device comprising:

an image processor capable of converting said plurality of pixels in said image from said first color model format to a (Y,r,θ) color model format, wherein for each pixel in said plurality of pixels, Y is an intensity component indicating a total amount of light, r is a saturation component indicating an amount of white light mixed with a color of said each pixel, and θ is a hue component indicating said color of said each pixel, wherein said image processor is capable of grouping spatially adjacent ones of said plurality of pixels into a plurality of image regions according to hue components of said adjacent pixels and performing a merging process wherein a first image region and a second image region proximate said first image region are merged into a composite region if a hue difference between said first and second image regions is less than a predetermined hue difference threshold, wherein said image processor is capable of calculating merit values for said plurality of adjacent regions, wherein a merit value of a first selected adjacent region is equal to a ratio of a common perimeter of said first image region and said first selected adjacent region to a total perimeter of said first selected adjacent region;

a display monitor for displaying said composite region; and a user input device for receiving user commands capable of controlling said merging process.

9. The image retrieval system set forth in claim 8 wherein said image processor is capable of determining a histogram of hue components of said pixels in said image, said histogram indicating a number of pixels of similar hue in said image.

10. The image retrieval system set forth in claim 9 wherein said image processor is capable of determining a dominant hue in said image using a peak detection algorithm on said histogram.

11. The image retrieval system set forth in claim 8 wherein said image processor is capable of determining and marking ones of said plurality of image regions having less than a predetermined minimum number of pixels and disregarding said marked image regions during said merging process.

12. The image retrieval system set forth in claim 8 wherein said image processor is capable of determining and marking achromatic ones of said plurality of image regions having less than a predetermined minimum number of pixels and disregarding said marked achromatic image regions during said merging process.

13. The image retrieval system set forth in claim 12 wherein said first and second image regions are merged if a number of pixels in said first image region and a number of pixels in said second image region are greater than a predetermined image region size threshold.

14. The image retrieval system set forth in claim 8 wherein said image processor selects said second image region to be merged with said first image region according to a merit value of said second image region.

15. For use in an image retrieval system capable of analyzing an image comprising a plurality of pixels in a first color model format, a method of detecting and retrieving from the image a selected image portion comprising the steps of:

converting the plurality of pixels in the image from the first color model format to a (Y,r,θ) color model format, wherein for each pixel in the plurality of pixels, Y is an intensity component indicating a total amount of light, r is a saturation component indicating an amount of white light mixed with a color of each pixel, and θ is a hue component indicating the color of each pixel;

grouping spatially adjacent ones of the plurality of pixels into a plurality of image regions according to hue components of the adjacent pixels and performing a merging process wherein a first image region and a second image region proximate the first image region are merged into a composite region if a hue difference between the first and second image regions is less than a predetermined hue difference threshold;

determining a plurality of adjacent regions to said first image region; and calculating merit values for said plurality of adjacent regions, wherein a merit value of a first selected adjacent region is equal to a ratio of a common perimeter of said first image region and said first selected adjacent region to a total perimeter of said first selected adjacent region.

16. The method set forth in claim 15 comprising the further steps of:

determining and marking ones of the plurality of image regions having less than a predetermined minimum number of pixels; and disregarding the marked image regions during the merging process.

17. The method set forth in claim 15 comprising the further steps of:

determining and marking achromatic ones of the plurality of image regions having less than a predetermined minimum number of pixels; and disregarding the marked achromatic image regions during the merging process.

18. The method set forth in claim 15 wherein the first and second image regions are merged if a number of pixels in the first image region and a number of pixels in the second image region are greater than a predetermined image region size threshold.

19. For use in an image retrieval system capable of analyzing an image comprising a plurality of pixels in a first color model format, computer executable process steps, stored on a computer readable storage medium, for detecting and retrieving from the image a selected image portion comprising:

converting the plurality of pixels in the image from the first color model format to a (Y,r,θ) color model format, wherein for each pixel in the plurality of pixels, Y is an intensity component indicating a total amount of light, r is a saturation component indicating an amount of white light mixed with a color of each pixel, and θ is a hue component indicating the color of each pixel; and grouping spatially adjacent ones of the plurality of pixels into a plurality of image regions according to hue components of the adjacent pixels and performing a merging process wherein a first image region and a second image region proximate the first image region are merged into a composite region if a hue difference between the first and second image regions is less than a predetermined hue difference threshold;

determining a plurality of adjacent regions to said first image region; and calculating merit values for said plurality of adjacent regions, wherein a merit value of a first selected adjacent region is equal to a ratio of a common perimeter of said first image region and said first selected adjacent region to a total perimeter of said first selected adjacent region.

20. The computer executable process steps, stored on a computer readable storage medium, set forth in claim 19 comprising the further steps of:

determining and marking ones of the plurality of image regions having less than a predetermined minimum number of pixels; and disregarding the marked image regions during the merging process.

21. The computer executable process steps, stored on a computer readable storage medium, set forth in claim 19 comprising the further steps of:

determining and marking achromatic ones of the plurality of image regions having less than a predetermined minimum number of pixels; and disregarding the marked achromatic image regions during the merging process.

22. The computer executable process steps, stored on a computer readable storage medium, set forth in claim 19 wherein the first and second image regions are merged if a number of pixels in the first image region and a number of pixels in the second image region are greater than a predetermined image region size threshold.

* * * * *